United States Patent [19]

Will et al.

[11] 4,323,988
[45] Apr. 6, 1982

[54] SONOBUOY SYSTEM

[75] Inventors: Albert S. Will, Bethesda; Earl A. Schuchard, Laurel; John P. Buckley; Armand Cioccio, both of Silver Spring; John C. Hetzler, Jr., Laurel; Sylvan Wolf, College Park, all of Md.; Donald E. Jefferson, Dobbs Ferry, N.Y.; Jim B. McQuitty, Hyattsville; Robert A. Urick, Silver Spring, both of Md.

[73] Assignee: The United States of America as represented by the Secretary of the Navy, Washington, D.C.

[21] Appl. No.: 545,209

[22] Filed: Apr. 19, 1966

[51] Int. Cl.³ .............................................. G01S 15/06
[52] U.S. Cl. ...................................... 367/4; 367/153; 367/173
[58] Field of Search ................... 340/2, 3, 5 E, 6, 8 S, 340/9; 367/3, 4, 5, 153, 165, 173

[56] References Cited

U.S. PATENT DOCUMENTS

| 3,039,094 | 6/1962 | Anderson | 367/173 X |
| 3,116,471 | 12/1963 | Coop | 367/3 |
| 3,141,148 | 7/1964 | Hueter | 367/153 |
| 3,262,388 | 7/1966 | McCarty | 367/137 X |

Primary Examiner—Richard A. Farley
Attorney, Agent, or Firm—R. S. Sciascia; A. L. Branning

[57] ABSTRACT

A deep water explosive echo ranging system capable of detecting high performance submarines by using favorable acoustic paths available at deep depths. An umbrella hydrophone array is deployed from a sonobuoy to deep depths; an electrical subsystem transmits data from the hydrophone array to a transmitter housed in a surface float unit; a multichannel receiver and signal processing and display apparatus in an aircraft receives and processes radio data signals sent from sonobuoy transmitters; and an explosive underwater charge package is remotely triggered by a command generator in the aircraft.

10 Claims, 14 Drawing Figures

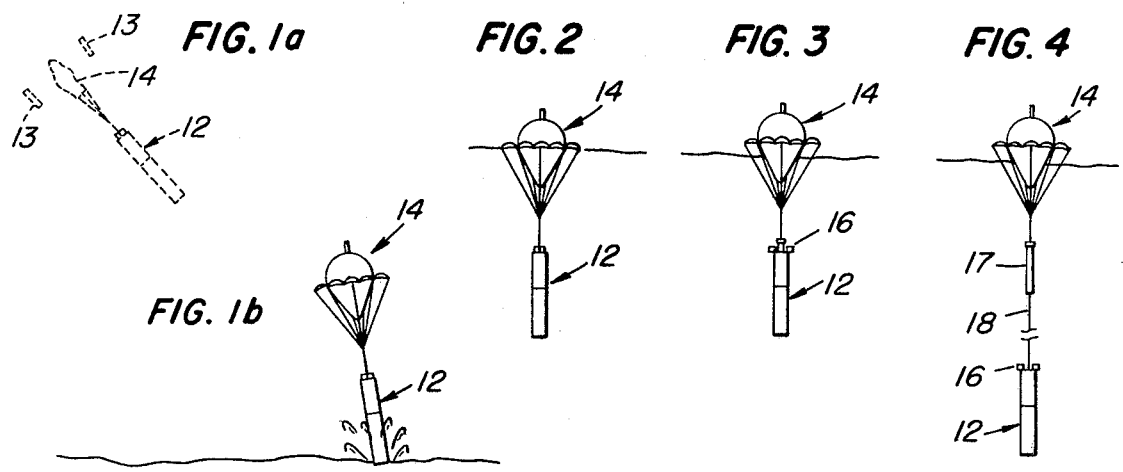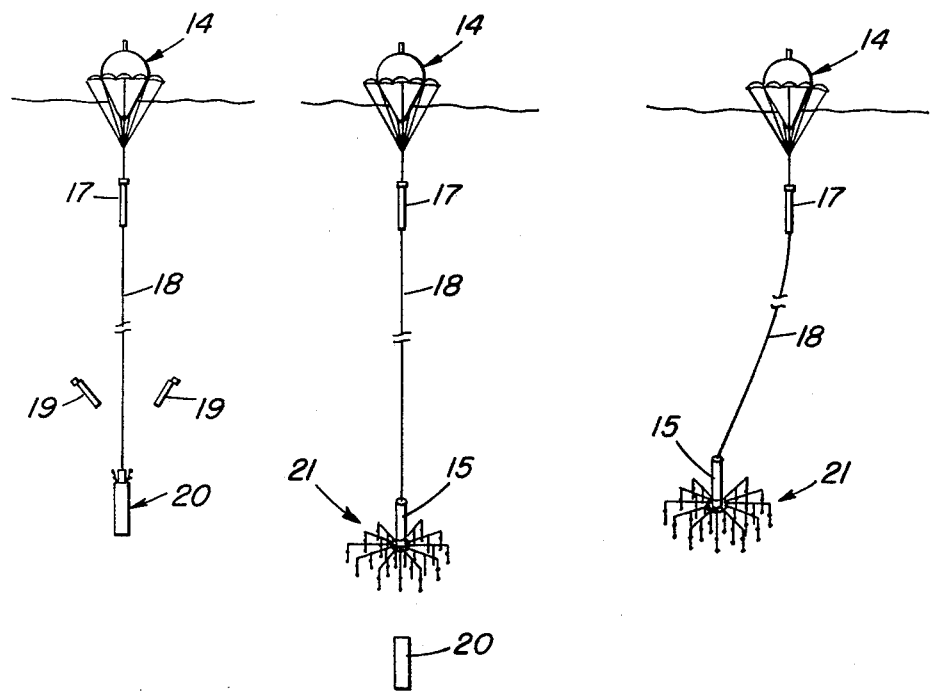

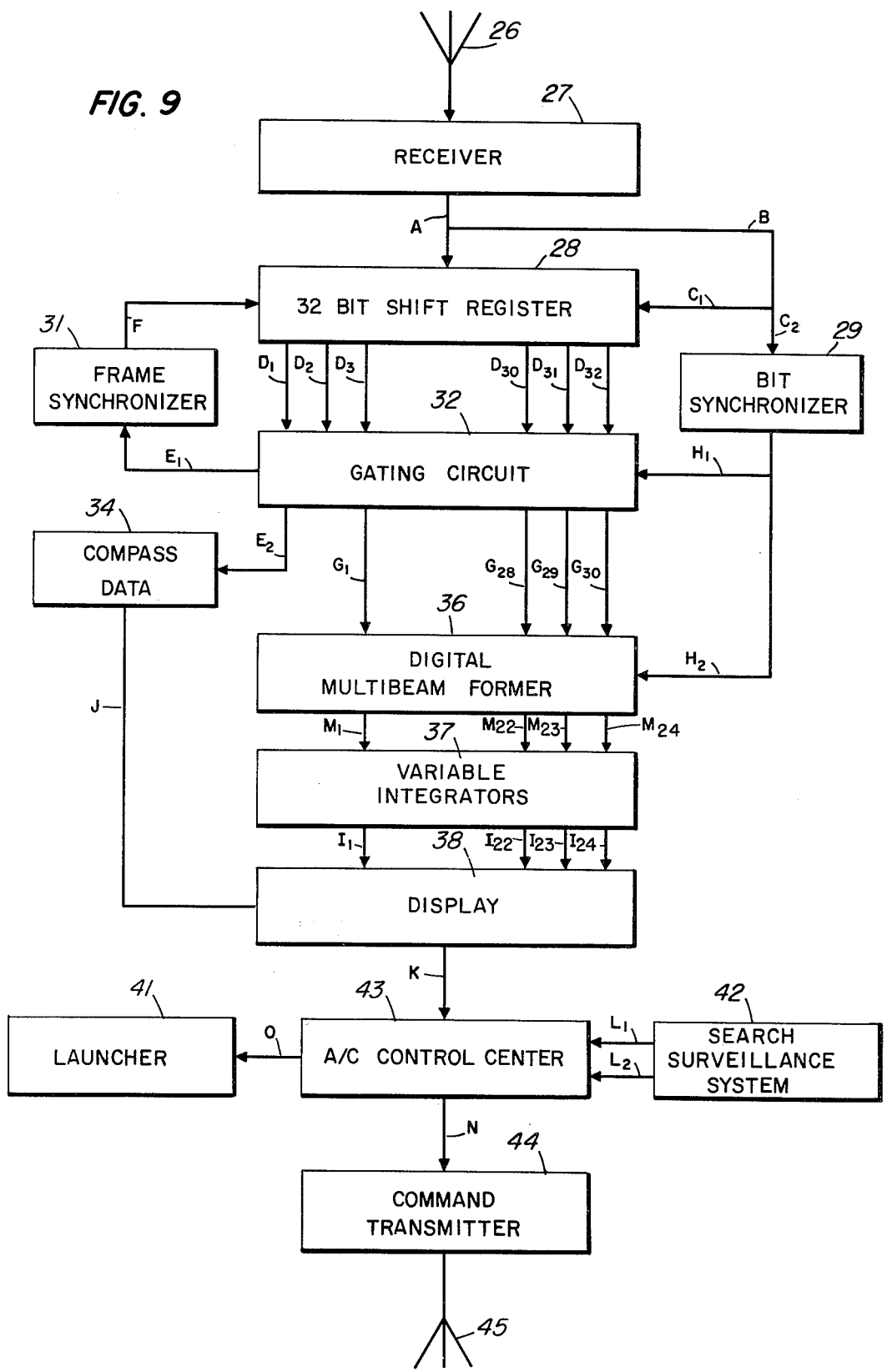

SONOBUOY SYSTEM

The invention described herein may be manufactured and used by or for the Government of the United States of America for governmental purposes without the payment of any royalties thereon or therefor.

This invention relates to a sonobuoy system and more particularly to a deep water echo ranging system for detecting targets using favorable acoustic paths available at deep depths.

The sonobuoy system of the present invention is a deep water multibeaming system which was developed to improve detecting capability in range and bearing over a large detection area using a single sonobuoy. A procedure for utilizing the sonobuoy system in a target detection operation initially requires deploying a sonobuoy into the sea in the vicinity where target detection is desirable. After entering the water a floating buoy supports a transmitter which floats near the surface of the water and a hydrophone array which is paid out by a long transmission cable to a deep depth. When the hydrophone array is in detection position, line explosive charges which have also been released into the water in the vicinity of the sonobuoy are fired by aircraft radio signals at a depth near that of the hydrophone array. The hydrophone array detects reflected pulses from any direction and provides a 360° discrimination directional pattern by means of a plurality of parallel beamformed detection channels. Parallel data signals from individual hydrophones are converted into a serial data stream and travel up the transmission cable to a radio transmitter which in turn transmits the data signals to a remote receiving station which may be located in the nearby aircraft or other suitable detection positions.

In the past sonobuoy systems of the echo ranging type have used a plurality of sonobuoys and various complicated mathematical schemes for detecting reflected pulses when attempting to localize a moving target at any great distance. Explosive echo ranging systems used in underwater detection have been satisfactory for short range detection when operating in relatively deep water but have been limited in range because of reverberation reflected from the sea surface and bottom. For extended range coverage a prohibitive number of sonobuoys and explosive charges have been required, thus necessitating the use of passive systems only for adequate long range coverage.

Hydrophone arrays of the line type are known and have been successful in achieving vertical directivity for suppression of reflected sound waves from the sea surface and the bottom, at relatively small angles from the vertical. These hydrophone arrays have not however been effective in suppression of reverberations returning from the surface at the same time as the target echo.

The general purpose of this invention is to provide a system which embraces all of the advantages of similarly employed sonobuoy systems and posseses none of the aforedescribed disadvantages. To attain this the present invention contemplates a unique sonobuoy arrangement utilizing a single sonobuoy for long range detection and a novel umbrella hydrophone array which provides both vertical and horizontal directivity.

Accordingly, an object of the present invention is the provision of a long range multi-beam echo ranging system having both vertical and horizontal directivity, which provides all weather capability with effective detection, and which has a relatively low cost per detection.

Another object is the provision of an echo ranging sonobuoy system which utilizes a single sonobuoy capable of operating at deep depths to permit large detection areas and which provides both range and bearing information.

Still another object is to provide a detection system for quiet targets or high speed nuclear submarines.

Yet another object is a provision of a submarine detection method utilizing a single sonobuoy at deep depths which provides range and bearing information, which has both vertical and horizontal directivity and which has a high degree of reliability as a detection device.

A still further object is to provide a sonobuoy long range detection system with is reliable, has a high degree of horizontal and vertical directivity, and is operated in either the active or the passive mode.

Yet a further object is the provision of a hydrophone array of the multi-beam type having the vertical directivity of a line hydrophone array and capable of being contained in a collapsed state until a desired sea depth is obtained.

Other objects and many of the attendant advantages of this invention will be readily appreciated as the same becomes better understood by reference to the following description when consideration in connection with the accompanying drawings in which like reference numerals designate like parts throughout the figures thereof and wherein:

FIGS. 1–7 illustrate the deployment sequence;

FIG. 9 illustrates a block diagram of the aircraft electronics;

Figure 8:
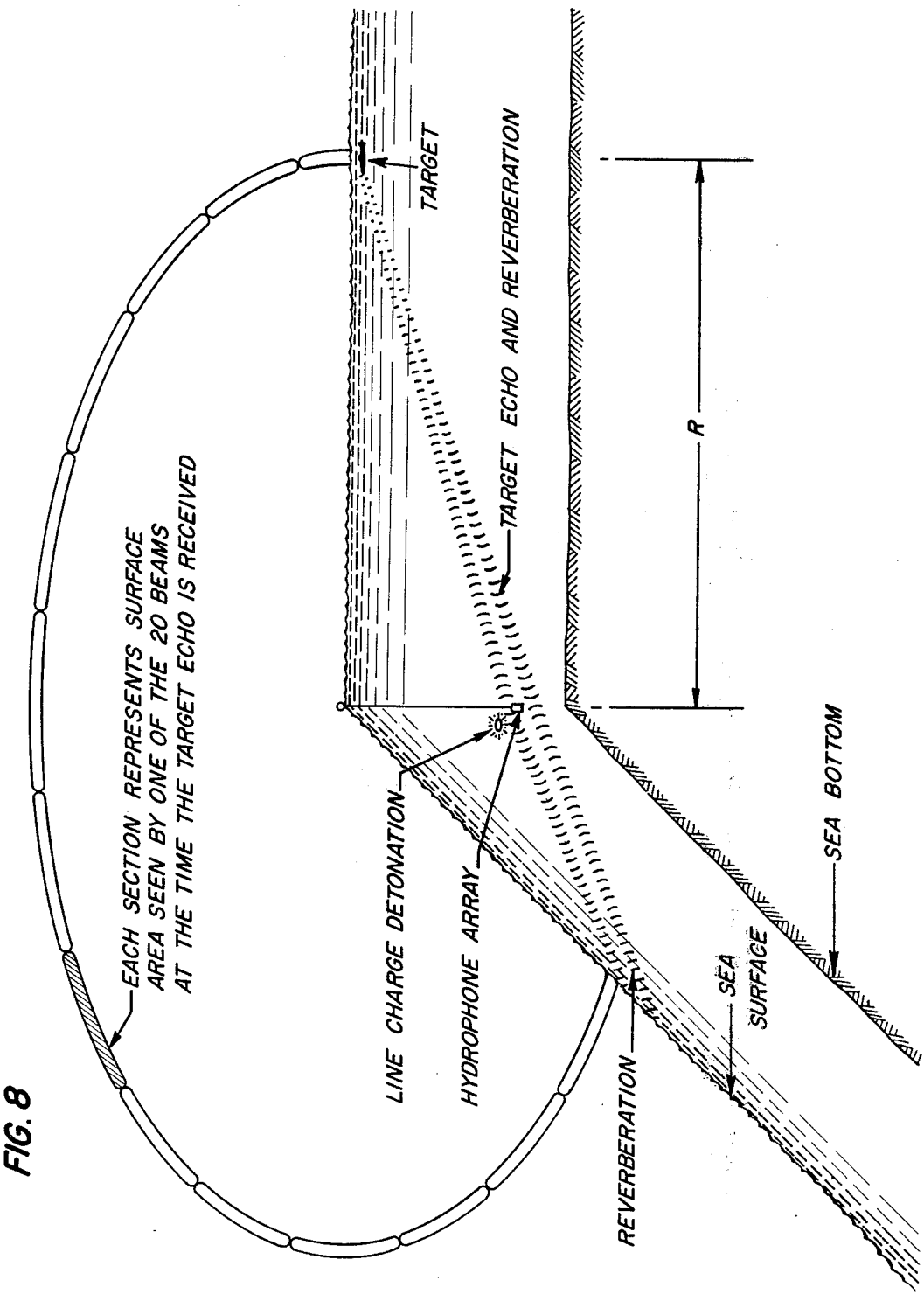
FIG. 8 illustrates a schematic of the detection method.

Referring now to drawings for an understanding of the invention, it is seen in FIG. 1(a) that parafloat cannister sections 13 break away allowing parafloat 14 to be released and inflated by air travel thereby retarding the sonobuoy until striking the water in FIG. 1(b). When sonobuoy 12 enters the water, parafloat 14 functions like a balloon and floats on the surface of the water as shown in FIG. 2. After a short delay, a release opens permitting fins 16 to pop out and the hydrophone array portion of sonobuoy 12 to sink leaving transmitter 17 suspended near the sea surface as shown in FIG. 14. The hydrophone array portion of sonobuoy 12 is connected to transmitter 17 by transmission cable 18 which is of sufficient length to permit the hydrophone portion of the sonobuoy to sink to the desired depth. Upon reaching the predetermined depth transmission cable casing 19 breaks away allowing hydrophone array 21 to slip from the hydrophone array casing portion 20. As hydrophone array 21 leaves casing 20 a plurality of spring loaded or hydraulically actuated arms each carrying several pairs of hydrophones erect like an umbrella to provide a volume array. The arms project from a central cannister 15 which is suspended by transmission cable 18.

In FIG. 7 the sonobuoy is shown in its final detecting and transmitting position. Cannister 15 contains the control electronics and the sea water battery. In response to a command signal from the launching aircraft power from the sea water battery is supplied to the electronics and a short time thereafter the sonobuoy becomes operable. After the aircraft establishes that the sonobuoy is operative appropriate explosive charges are dropped in the vicinity of the sonobuoy.

FIG. 8 is a schematic of a multibeaming method of echo detection. The hydrophone array is suspended in the sea at a depth of approximately 10 thousand feet where sound from the line charge detonation at the same depth is returned to the hydrophone array from the sea surface, the sea bottom, any biological scatters within the insonified volume, and from a target such as a submarine. The hydrophone volume array has precise spacings between hydrophones and is arranged to provide vertical directivity and horizontal directivity by forming 24 overlapping horizontal beams which provide rejection for reverberation at the same range as the target except for that in the beam with the target echo. Each beam section represents the surface area which may be seen by one of the 24 beams at the time the target echo is received. A compass also provides reference for the beams so that both range and bearings may be accurately determined.

The aircraft electronics for the sonobuoy system are shown in FIG. 9. An antenna 26 receives hydrophone radio signals transmitted from the sonobuoy and converts them to electrical signals. The signals received by receiver 27 are time division multiplex signals.

Figure 10:
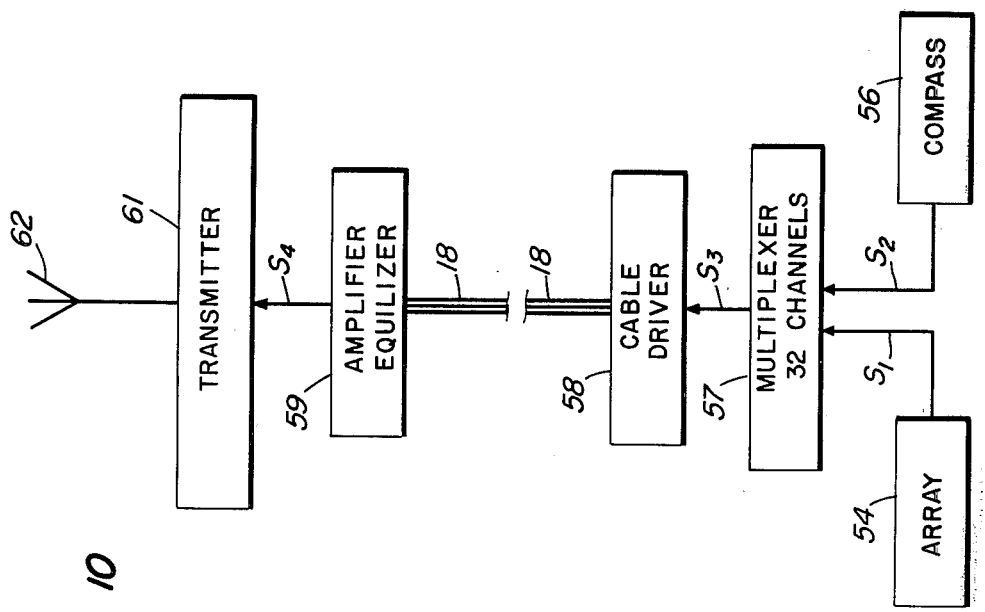
FIG. 10 illustrates a block diagram of the sonobuoy subsystem electronics and transmission cable.

In FIG. 10 array 54 supplies echo information from 30 separate hydrophones over leads S1 to multiplexer 57 while bearing information is provided by compass 56 over lead S2. The multiplexer 57 provides time division multiplexing which retains only zero crossing information. The 30 separate hydrophone output signals are amplified and then infinitely clipped and put into digital form. These signals are simultaneously gated in parallel into a 32 stage shift register (not shown) in multiplexer 57 wherein each signal determines the state (0 or 1) of its shift register stage. Compass information in digital form supplied over lead S2 and a clock synchronizing signal enter the two remaining stages of the shift register whereupon they are gated and circulated out of the shift register along with the hydrophone signals. A serial data stream is fed over lead S3 to cable driver 58 and up transmission cable 18 to amplifier equalizer 59. Cable driver 58 is an amplifier which shapes the data stream to avoid transmission of d.c. signal components and eliminates various level shifts due to changes in data or data rate.

After equalization and amplification the serial data stream is transmitted to the aircraft by broadband transmitter 61 over antenna 62. Transmitter 61 may be either a single side band or phase shift keyed type transmitter known to those skilled in the art. Antenna 62, however, is of the inflatable type forming part of the retardation and flotation unit of the sonobuoy and consisting of a vertical radiating element and associated ground plane elements attached to the flotation bag.

Referring to FIG. 9 receiver 27 provides serial data information on outputs A and B when signals are received over antenna 26 from the sonobuoy transmitter. Digital input information over line A is fed serially into shift register 28 and fed out in parallel over output leads D1 to D32. Channel D32 provides a time slot for timing frame synchronization and channel D31 provides a time slot for compass data information. Channels D1 to D30 correspond one each to the thirty hydrophones in the remote hydrophone array. Digital information over lead B also acts to control bit synchronizer 29 with signals over lead C2, and to control the shifting of shift register 28 with signals over control lead C1. Gating circuit 32 passes the digital information of the thirty hydrophones once each frame over output leads G1 to G30 to digital multibeam former 36. The bearing information also in digital form is gated over lead E2 to compass data processor 34 which bypasses the multibeam former. Frame synchronizer 31 receives a digital control pulse over lead E1 and acts to synchronize the frames as they are received by the shift register over control lead F. Bit synchronization is supplied to gating circuit 32 and digital multibeam former 36 over control leads H1 and H2, respectively.

The multibeam former 36 contains thirty serial input shift registers for continuous monitoring of each bit received over leads G1 to G30. For providing appropriate delays to each of the thirty hydrophone channels, twenty-four summing resistive networks are connected to predetermined delay points of the bit monitoring shift registers thereby providing twenty-four parallel beam outputs M1 to M24. Each of the channels M1 to M24 corresponds to a search beam segment having the same range as the segment containing the target.

Essentially shift register 28 performs the inverse of the multiplexing operation of the deep hydrophone array electronics. The synchronizing signal carried in channel D32 is used to establish channel identity in the aircraft assuring that each channel signal is associated with the proper hydrophone. The thirty hydrophone channel signals are fed into a band of thirty shift registers over leads G1 to G30 which provide the appropriate delays whereupon the delayed signals are mixed in twenty-four resistive summing amplifiers simultaneously. The amplifier outputs M1 to M24 are a set of twenty-four signals each representing one of a set of overlapping beams effectively enabling the stationary hydrophone array to look into twenty-four directions in a horizontal plane continuously and simultaneously.

The beams M1 to M24 are passed directly to display unit 38 if an explosive sound source is used. When the hydrophone system functions in the passive mode with detecting target generated noise used in lieu of echoes generated by an explosive charge source, a longer integration time is required. Variable integrators 37 therefore may be switched into and out of a circuit between the multibeam former 36 and display unit 38 depending on whether the passive mode or the active mode of target detection is utilized. Along with the twenty-four overlapping beams displayed at display unit 38, bearing information is also displayed as information is received over channel J from compass data processor 34. The display information on range and bearing is then transmitted over lead K to the aircraft control center 43.

The aircraft control center is capable of processing the information of a plurality of sonobuoys and of generating a plurality of command signals to control sonobuoy operation and initiate the firing of a plurality of buoy underwater sound sources. Control center 43 receives search and/or surveillance system information concerning a plurality of sonobuoys and target possibilities over leads L1 and L2. The control center also operates launcher 41 with a signal over lead O when a sonobuoy is to be dropped. Transmitter 44 can then transmit command or interrogation signals to the sonobuoy or to the underwater sound source. A command function generator (not shown) in the control center 43 provides a plurality of selectable addresses for sonobuoy control. A buoy underwater sound source control and display means (not shown) in the control center also provides means to select and control the firing of a plurality of underwater sound sources and to display the number of charges fired on each sonobuoy.

Figure 11:
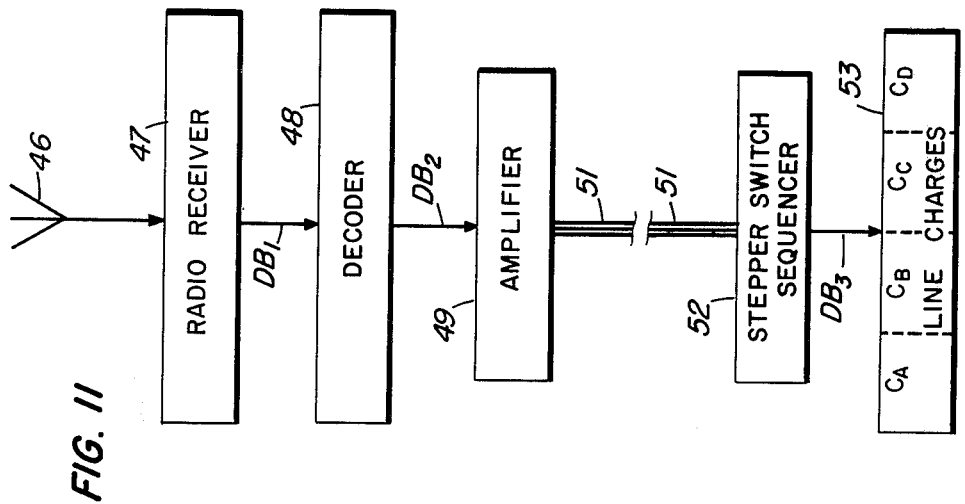
FIG. 11 illustrates the block diagram of the buoy underwater sound source.

FIG. 11 shows the block diagram of the buoy underwater sound source which is deployed at the same depth as the sonobuoy. The deep sound source consists of line charges $C_A$, $C_B$, $C_C$ and $C_D$ which are fired on command by the command generator in the aircraft. A charge is released from line charges 53 upon radio command at approximately one minute intervals. A radio command signal is received in radio receiver 47 over antenna 46 which is processed over line DB1 into decoder 48. The output of decoder 48 passes over line DB2 through amplifier 49 to coaxial cable 51. Stepper switch sequencer 52 thereupon releases line charges 53 as the command signal is received over line DB3. A plurality of repeated shots are required to resolve pulse signals, to reduce the false alarm rate to an acceptably low level, and to enhance detection probability. A criterion, that more than one signal returning and corresponding in time of arrival are required for a target detection, is made feasible with the present system.

Figure 12:
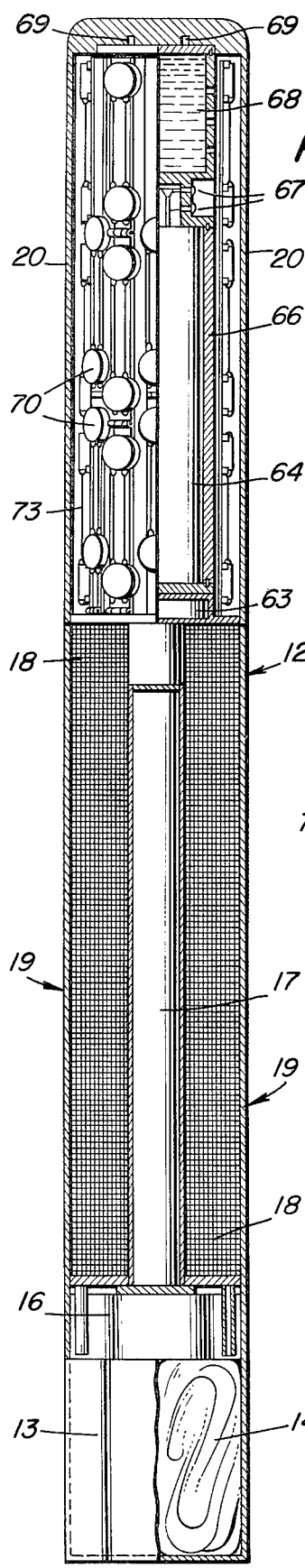
FIG. 12 illustrates a cross-section of the sonobuoy subsystem package before releasing from the aircraft.

The sonobuoy package itself is shown in FIG. 12. Housing 12 closes all of the sonobuoy except the parafloat portion which is contained by housing 13 until it breaks away from parafloat 14 immediately after ejection of the capsule from the aircraft. Sonobuoy transmitter 17 is inserted into a cylindrical space which is encircled by transmission cable 18 wound in the space between the cylindrical space and the outer housing 19. Releasing fins 16 clamp the transmitter in position until they deploy after the sonobuoy is in the water. When cable 18 is completely payed out housing section 19 breaks away and housing portion 20 slides off hydrophone array 21. The surface electronic cannister 17 contains the radio transmitter and the command receiver with associated power supplies. On reaching operating depth the outer case 20 of the sonobuoy slides off with the help of spring 69 allowing spring loaded arms 73 carrying hydrophone pairs 70 to erect in an umbrella fashion. The array becomes a volume array having predetermined spacings between hydrophones. The hydrophone electronics are housed in cannister 64 which is powered by sea water battery 68.

Figure 13:
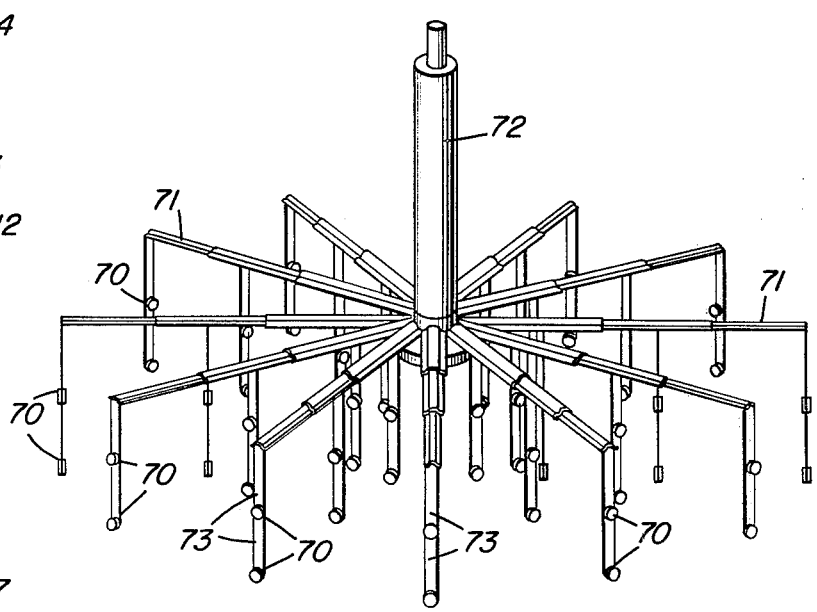
FIG. 13 illustrates the umbrella-like hydrophone array with the hydrophone arms extended.

The hydrophone volume array is shown in its erected form in FIG. 13. When the volume array erects arms 71 move from the packaged position closed against cannister 72 to the perpendicular radially extending positions shown. In the operative position arms 71 extend radially outward with varying combinations of hydrophones pairs 70 connected to stave 73 extending downward perpendicularly from the arms. Staves 73 supporting hydrophones 70 are connected to arms 71 at one of three different positions. There are twelve equally spaced horizontal arms 71 and each arm has alternate two or three vertical staves 73 with two hydrophones 70 per stave so that there is a total of thirty separate hydrophone detection outputs. In the packaged condition staves 73 fold against their respective horizontal arms 71 so that all hydrophones are neatly packaged into a small volume when not in use.

Passive listening or active echo sounding sources may be used with the invention. Explosive line charges, fired at the same depth as the sonobuoy array and in succession have been found to provide long range detection with a high detection probability. Repeating shots reduces the false alarm rate of erroneous target detection by introducing a criterion requiring more than one echo signal returning to the hydrophone array from the same range and bearing position.

The output from the signal procession can be represented on a 24-channel recorder, one trace for each beam although the number of beams may be any number which will provide both 360° horizontal directivity as well as vertical directivity. Aural backup can be incorporated for each recorder trace to permit both visual and aural decision on beam traces of special interest.

The remote detection system may be an automatic system which stores signals in each channel in excess of a set threshold in a suitable memory. The signals can then be compared on a time and pseudo amplitude basis using correlation techniques with successive signals from the additional line charge shots. An alternate automatic system could use a plan position indicator oscilloscope which displays signals from a single explosive shot in excess of a set threshold from all beams simultaneously. This display may then be photographed for later comparison with that from successive shots. In both of these automatic systems range would be determined by signal reflection time and the bearing from the beam the signal appears in.

From the foregoing it is now apparent that the sonobuoy system of the invention is a deep water echo ranging system which is capable of detecting high performance submarines and other targets using favorable acoustic paths available at deep depths. The system reliably detects targets over large detection areas by using a single sonobuoy which has a volume hydrophone array disposed at a favorable sea depth.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A sonobuoy system for underwater detection of a long range target over a wide detection area comprising, a multibeam omnidirectional sonobuoy dropped in the vicinity of an underwater target having means for detecting acoustic signals in a plurality of beam sections simultaneously which sectors provide a 360° discrimination directional pattern, compass means for referencing said beam sectors and means for transmitting simultaneously compass information, and target range and target bearing information signals from each of said sectors to a remote location, remote control means providing an initiating signal to said sonobuoy when the sonobuoy is in a predetermined detection position, receiving means in said remote location for receiving and processing said information signals transmitted from said sonobuoy, means electrically connected to said receiving means for discriminating between sectors having nontarget reverberation signals and a sector containing a target, and means for displaying said target range and bearing information.

2. The apparatus of claim 1 further comprising in said sonobuoy
   a transmitter floating near the surface of the water,
   a hydrophone array deployed at a predetermined depth having a plurality of horizontal and vertical directivity transducers connected to said array, providing a plurality of individual detection channels to acoustic signals originating underwater,
   a long transmission cable extending to said predetermined depth, connected to said transmitter at the surface end thereof,
   digital sampling means in said array periodically sampling said transducer detection channels simultaneously, and
   multiplexing means connecting said array to the deep end of said transmission cable.

3. The apparatus of claim 1 wherein said receiving means comprises a radio signal receiver, a demultiplexer, and a multibeam former, said receiver having an input connected to said demultiplexer, said demultiplexer having a plurality of output channels corresponding to said sonobuoy detection channels, and
   said multibeam former coupled to said output channels combining predetermined ones of said output channels into a plurality of overlapping beam channels corresponding to sectors of detection volume in the water.

4. The apparatus of claim 2 wherein said receiving means comprises a radio signal receiver, a demultiplexer, and a multibeam former, said receiver having an input connected to said demultiplexer, said demultiplexer having a plurality of output channels corresponding to said sonobuoy detection channels, and
   said multibeam former coupled to said output channels combining predetermined ones of said output channels into a plurality of overlapping beam channels corresponding to sectors of detection volume in the water.

5. The apparatus of claim 3 further comprising a variable integrator means connected between the said overlapping beam channels and said display means whereby said sonobuoy system passively detects target generated noise signals.

6. A sonobuoy apparatus capable of being launched by an aircraft into the sea comprising
   a three piece sequentially removable housing containing a deflated parafloat, a long helically wound transmission cable, a transmitter, and a collapsed hydrophone array,
   a first of said housing pieces, enclosing said parafloat and breakably sectioned into two portions which separate from said sonobuoy upon launching,
   a second housing piece having an inside sleeve and an outside sleeve with the cylindrical space of said inside sleeve containing said transmitter and having said cable wound around said inside sleeve filling the space between said sleeves, said second housing piece sectioned into two portions which separate from said sonobuoy when said cable is being extended to a predetermined sea depth, and
   a third housing piece, spring releasable from said sonobuoy, enclosing said collapsed hydrophone array until said array reaches a predetermined depth.

7. The apparatus of claim 12 wherein said hydrophone array comprises an electronic cannister, means connecting said cannister to said cable,
   a plurality of spring loaded arms movable from a parallely collapsed position against said cannister to a radially extending position perpendicular to said cannister, and
   a plurality of staves having transducer elements connected thereto each hingedly connected to one of said arms at one of a plurality of positions along a arm, said staves movable from collapsed position against said arms to perpendicularly extending positions extending downward from said arms.

8. A hydrophone volume array comprising
   an electronic cannister,
   means connecting said cannister to a deep water supporting cable,
   a plurality of spring loaded arms movable from a parallely collapsed position against said cannister to a radially extending position perpendicular to said cannister, and
   a plurality of staves having transducer elements connected thereto each hingedly connected to one of said arms at one of a plurality of positions along a arm, said staves movable from collapsed position against said arms to perpendicularly extending positions extending downward from said arms.

9. A method of detecting and localizing an object in a water area by a mobile station comprising the steps of
   moving the mobile station into the water area, dispatching a multibeam omnidirectional sonobuoy from the mobile station into the water area, dispatching an explosive charge from the mobile station into the water area near the multibeam omnidirectional sonobuoy, simultaneously generating an omnidirectional detection pattern divided into a plurality of sectors, detonating said charge by a signal from the mobile station, and determining the sector location and range of said object from a single pressure pulse generated by said charge.

10. A method of detecting a long range target with a single sonobuoy deployed into the sea in the vicinity of a target using favorable acoustic paths in deep water comprising the steps of
    lowering a hydrophone array having a plurality of directional transducers to an acoustically favorable deep water depth,
    emitting a sound signal in the vicinity of said hydrophone array to provide echo signals from reflecting surfaces including a possible target surface,
    detecting echo signals from a target location and any other reverberation signals returning at the same time to the array,
    processing said detected signals and compass information signals through an underwater transmission channel to a surface transmitter for aerial transmission to a remote receiving location,
    directing said processed signals into preassigned overlapping beam channels at said remote location wherein each beam is an electrical representation of a predetermined volume sector of water, and
    comparing electrical signals in beam channels containing both target location information and reverberation signals with electrical signals in the beam channels containing only reverberation signals, whereby the location of said target is identified with information from a single sonobuoy.

* * * * *